United States Patent
Sakuragi

(10) Patent No.: US 6,465,789 B1
(45) Date of Patent: *Oct. 15, 2002

(54) SIGNAL PROCESSING APPARATUS

(75) Inventor: Takamasa Sakuragi, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/572,794

(22) Filed: May 17, 2000

(30) Foreign Application Priority Data

May 19, 1999 (JP) .......................................... 11-138654

(51) Int. Cl.[7] .................................................. H04N 7/12
(52) U.S. Cl. .............................. 250/370.08; 250/370.09
(58) Field of Search ........................ 250/370.08, 370.09; 327/103; 358/443, 475; 330/254, 255

(56) References Cited

U.S. PATENT DOCUMENTS

| | | | |
|---|---|---|---|
| 4,716,305 A | 12/1987 | Sakuragi et al. | 307/296 R |
| 5,268,757 A | 12/1993 | Nagai et al. | 358/141 |
| 5,382,917 A * | 1/1995 | Miyake et al. | 330/255 |
| 5,515,004 A * | 5/1996 | Alford et al. | 330/254 |
| 5,515,103 A | 5/1996 | Ito | 348/312 |
| 5,656,818 A * | 8/1997 | Nygard | 250/370.09 |
| 5,835,045 A * | 11/1998 | Ogawa et al. | 341/155 |
| 5,880,639 A | 3/1999 | Sakuragi | 330/255 |
| 5,910,938 A * | 6/1999 | Kimura | 369/116 |
| 6,114,882 A * | 9/2000 | Flynn | 327/103 |
| 6,288,797 B1 * | 9/2001 | Ueno | 358/443 |

OTHER PUBLICATIONS

Elefterov et al., "Analog–Digital Processing of Charge–Coupled Devices Output," Instruments and Experimental Techniques, vol. 30, No. 6, 11/87, pp. 1357–1359.

* cited by examiner

Primary Examiner—Constantine Hannaher
Assistant Examiner—Otilia Gabor
(74) Attorney, Agent, or Firm—Fitzpatrick, Cella, Harper & Scinto

(57) ABSTRACT

A signal processing circuit capable of improving an S/N ratio of common mode rejection operation at a low power source voltage. In the signal processing circuit, a voltage difference between first and second signals is amplified by a first amplifier circuit and a second amplifier circuit having characteristics opposite to characteristics of the first amplifier circuit, a signal amplified by the first amplifier circuit is converted into a digital signal by a first converter circuit, a signal amplified by the second amplifier circuit is converted into a digital signal by a second converter circuit, and a differential circuit calculates a difference between an output signal from the first converter circuit and an output signal from the second converter circuit, wherein the first amplifier circuit outputs an amplified signal to the first converter circuit by receiving a voltage corresponding to a lower limit value of the input dynamic range of the first converter circuit, and the second amplifier circuit outputs an amplified signal to the second converter circuit by receiving a voltage corresponding to an upper limit value of the input dynamic range of the second converter circuit.

11 Claims, 5 Drawing Sheets

SIGNAL PROCESSING APPARATUS

BACKGROUND OF THE INVENTION

1. Field of the Invention

The present invention relates to a signal processing apparatus for processing a plurality of signals.

2. Related Background Art

A signal processing apparatus of one conventional type receives a signal and a black level signal, the signal being output from a photosensor or the like and containing a black level signal and a light signal, and subtracts the black level signal from the signal containing the black signal and the light signal to obtain the light signal with the black signal being eliminated. Such a conventional signal processing circuit will be described.

FIG. 1 is a circuit diagram of a conventional signal processing apparatus. The signal processing circuit shown in FIG. 1 has: buffer amplifiers 41 and 42 for receiving a signal output from a sensor or the like at a high input impedance and outputting the signal at a low output impedance; a subtractor amplifier 43 for subtracting one signal from the other respectively output from the buffer amplifiers 41 and 42; and an A/D converter (not shown) for converting an analog signal subtracted by the subtractor amplifier 43 into a digital signal.

The operation of the signal processing circuit shown in FIG. 1 will be described. A light signal containing a black level signal output from a sensor and another black level signal are input to the buffer amplifiers 41 and 42. The signals output from the buffer amplifiers 41 and 42 are input via resistors R3 and R1 to the subtractor amplifier 43.

The subtractor amplifier 43 subtracts the black level signal from the light signal and amplifiers it, this amplified signal being added to a signal having a predetermined value and output. This predetermined value is set to a lower limit value of a input voltage range (dynamic range) of the A/D converter in order to utilize the maximum dynamic range and improve a resolution. The signal output from the subtractor amplifier 43 is input to the A/D converter to convert the analog signal into a digital signal which is output to the external.

FIG. 2 is a circuit diagram showing the internal structure of the buffer amplifiers 41 and 42 and subtractor amplifier 43. Referring to FIG. 2, reference numeral 51 represents a power source terminal, reference numeral 52 represents a positive input terminal, reference numeral 53 represents a negative input terminal, and reference numeral 54 represents an output terminal. As shown in FIG. 2, for example, a light signal is input to the positive input terminal 52 and amplified by a differential amplifier having as its gate electrodes the positive and negative input terminals 52 and 53, thereby being output from the output terminal 54 thereof as a single end terminal.

Tendency of low power consumption in the field of electronics is changing a supply voltage for most electronic apparatuses and components to a low supply voltage. The power voltage of 5V was used for most integrated circuits (IC) in several years ago. Now, a power voltage of 3 V or lower is used. A lowered power voltage means a narrower dynamic range of the subtractor amplifier 43, buffer amplifiers 41 and 42 and the like.

With conventional techniques, as the power voltage is lowered, the dynamic range becomes narrower and an amount of signal components S is reduced. Even if the dynamic range is narrowed, an amount of noises N such as switching noise and random noises is not reduced because the noise amount is not dependent upon an input signal such as a light signal. As the dynamic range is narrowed, the S/N ratio therefore lowers.

In order to retain a desired S/N ratio even if the power voltage is lowered, it is necessary to reduce random noises su h as thermal noises generated in each amplifier as the dynamic range narrows. Of noises generated in a signal processing circuit, most of random noises are generated in buffer amplifiers and a subtractor amplifier. Switching noises are generated in a digital circuit such as an A/D converter.

Common power source and ground lines are often used for both a digital circuit such as an A/D converter and an analog circuit such as a buffer amplifier and a sensor. If these power source and ground lines are used in common, the digital circuit and buffer amplifier have the same impedance of the power source and ground lines. Therefore, switching noises generated in the digital circuit appear at the output of the analog circuit such as a subtractor amplifier.

In the analog signal substraction circuit shown in FIG. 1, the common mode rejection ratio of the light signal and black level signal in an output signal of the subtractor amplifier becomes low if a ratio R1/R2 is not equal to a ratio R3/R4, where R1 is a resistor between the buffer amplifier and the subtractor amplifier at the black level signal side, R2 is a resistor between a voltage source for supplying a predetermined voltage and the subtractor amplifier, R3 is a resistor between the light signal side buffer amplifier and the subtractor amplifier, and R4 is a resistor between the input and output terminals of the subtractor amplifier.

SUMMARY OF THE INVENTION

It is an object of the invention to provide a signal processing apparatus capable of outputting a signal having a high S/N ratio.

In order to achieve the above object, according to aspect of the present invention, there is provided a signal processing circuit comprising: first differential means for executing a differential operation between first and second signals to output a third signal; amplifier means for outputting fourth and fifth signals in accordance with the third signal output from the first differential means; converter means for converting the fourth and fifth signals which are analog signals, into digital signals; and second differential means for executing a differential operation between the digital fourth and fifth signals converted by the converter means, wherein the amplifier means outputs the fourth and fifth signals in accordance with a signal level of the third signal, the fourth and fifth signals output from the amplifier means having a signal level between lower and upper limit values of a dynamic range of the converter means.

Other objects and features of the present invention will become apparent from the following detailed description of the embodiments when read in conjunction with the accompanying drawings.

DETAILED DESCRIPTION OF THE PREFERRED EMBODIMENTS

Embodiments of the invention will be described with reference to the accompanying drawings.

Figure 1:
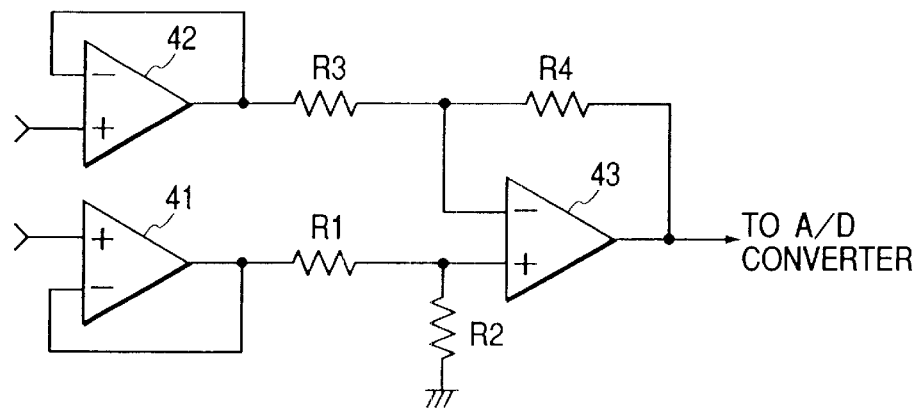
FIG. 1 is a circuit diagram of a signal processing apparatus according to conventional techniques.
Figure 2:
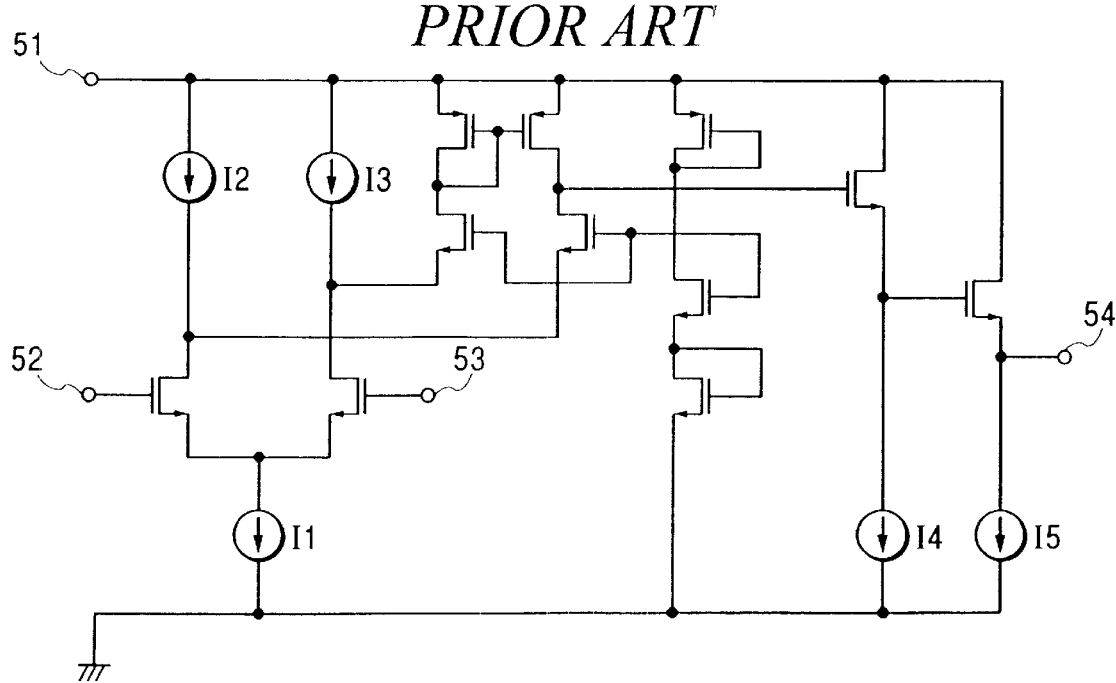
FIG. 2 is a circuit diagram of buffer amplifiers and a subtractor amplifier shown in FIG. 1.
Figure 3:
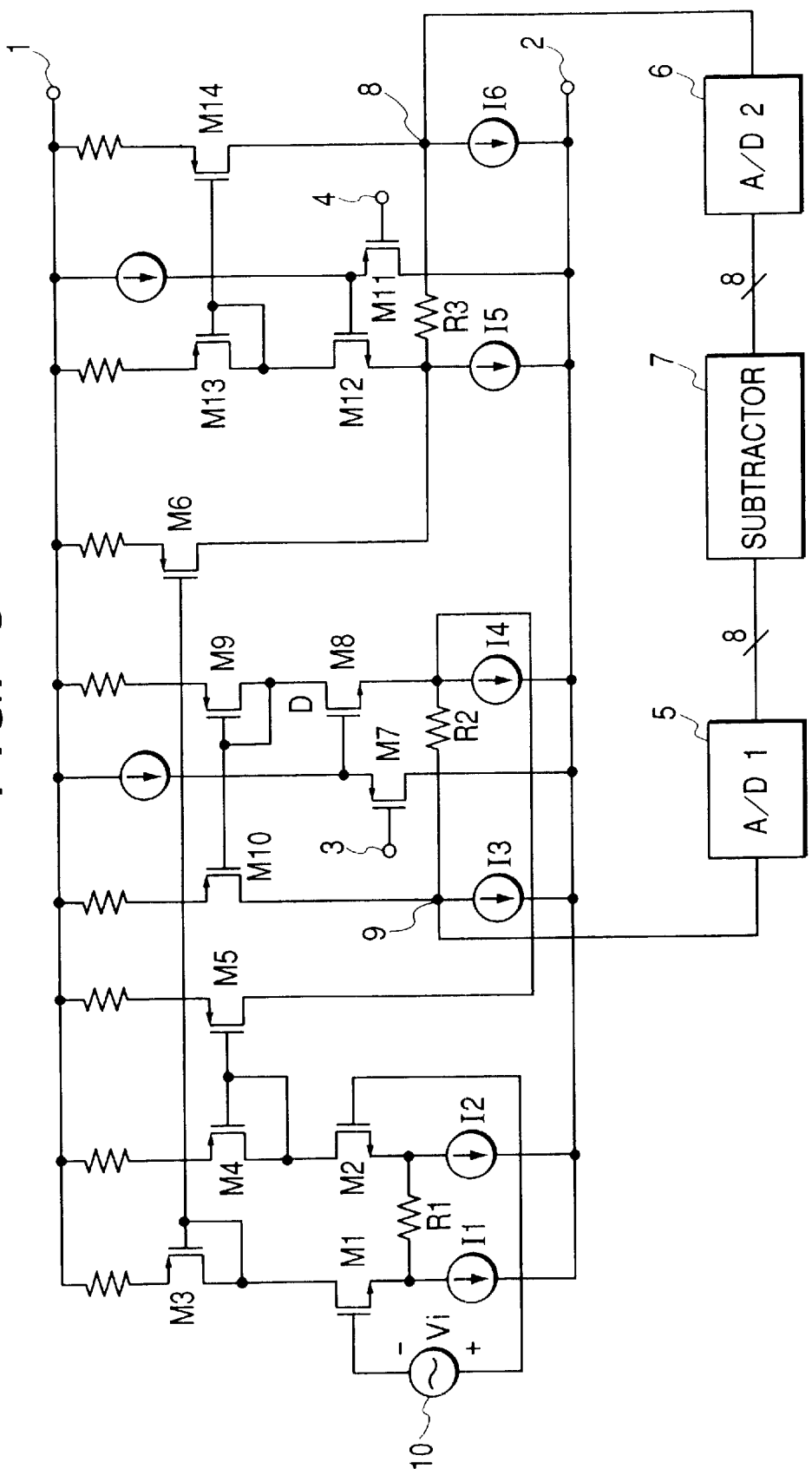
FIG. 3 is a circuit diagram of a signal processing circuit according to a first embodiment of the invention.

FIG. 3 is a circuit diagram of a signal processing apparatus according to the first embodiment of the invention. In FIG. 3, reference numeral 1 represents a power source terminal, reference numeral 2 represents a ground terminal, reference numerals 3 and 4 represent a voltage input terminal, and reference numerals 5 and 6 represent an A/D converter. A voltage to be applied to the voltage input terminal 3 is set equal to an upper limit value $V_{iH}$ of the input dynamic range of the A/D converters 5 and 6. A voltage to be applied to the voltage input terminal 4 is set equal to a lower limit value $V_{iL}$ of the input dynamic range of the A/D converters 5 and 6.

Reference numeral 7 represents a digital subtractor, reference numerals 8 and 9 represent an output terminal, and reference numeral 10 represents a differential input voltage source which outputs a voltage $V_i$. If a signal from a photosensor is to be input, the differential input voltage source outputs a difference between a light signal having a black level as its reference level and a black level signal. M1, M2, M8 and M12 represent an NMOS transistor, and M3 to M7, M9, M10, M11, M13 and M14 represent a PMOS transistor. Pairs of M3 and M6, M4 and M5, M9 and M10, and M13 and M14 each constitute a current mirror circuit.

I1 to I6 represent a bias current source. The bias current sources I1 and I2 output a current I, the bias current sources I4 and I5 output a current (2×I). The bias current sources I3 and I6 output a current I.

The operation of the signal processing circuit shown in FIG. 3 will be described. The voltage $V_i$ of the differential input voltage source 10 is applied to the gate terminals of the NMOS transistors M1 and M2. Namely, in the case of a photosensor, a light signal having the black level as its reference level is applied to the gate (control electrode) terminal of M1, and a black level signal is applied to the gate terminal of M2. In addition to the current I from the bias current sources I1 and I2, a signal current $V_i/R1$ which is provided by voltage-current conversion by a resistor R1 connected between the sources (first main electrodes) of the NMOS transistors M1 and M2, flows through the drains (second main electrodes) of M1 and M2.

The current flowing through each of the drains of M1 and M2 also flows through M6 and M5 via current mirror circuits. The drain current of M5 therefore flows through the source of the NMOS transistor M8, and the drain current of M6 flows through the source of the NMOS transistor M12.

Since the current sources I4 and I5 supplying the current 2I are connected to the source of the NMOS transistors M8 and M12, a current of $[2I-(I+V_i/R1)]=[I-V_i/R1]$ flows through the source of the NMOS transistor M8.

The PMOS transistors M9 and M10 constitute a current mirror. A negative feedback is realized by a connection of the drain of the PMOS transistor M10 to the source of the NMOS transistor M8 via the resistor R2. Therefore, of the current $[I-V_i/R1]$ applied to the source of the NMOS transistor M8, a current $[-V_i/R1]$ which is difference between the current $[I-V_i/R1]$ and the current I of the constant current source I3, flows through the drain of the PMOS transistor M10 via the resistor R2.

A voltage approximately same as the voltage $V_{iH}$ applied to the gate of the PMOS transistor M7 is applied to the source of the NMOS transistor M8 and the current flowing through the resistor R2 is $V_i/R2$. Thus, an output voltage at the output terminal 9 is $[V_{iH}-(R2/R1)V_i]$ when the direction of the current is taken into consideration.

Similarly, the PMOS transistors M13 and M14 constitute a current mirror. A negative feedback is realized by a connection of the drain of the PMOS transistor M14 to the source of the NMOS transistor M12 via the resistor R3. Therefore, of the current $[I-V_i/R1]$ flowing through the source of the NMOS transistor M12, a current $[2I-(I-V_i/R1)]=[I+V_i/R1]$ which is difference betwen the current $[I-V_i/R1]$ and the current 2I of the constant current source I5, flows through the drain of the PMOS transistor M14 via the resistor R3.

A voltage approximately same as the voltage $V_{iL}$ applied to the gate of the PMOS transistor M11 is applied to the source of the NMOS transistor M12 and the current flowing through the resistor R3 is $V_i/R1$. Thus, an output voltage at the output terminal 8 is $[V_{iL}+(R3/R1)V_i]$.

Figure 4:
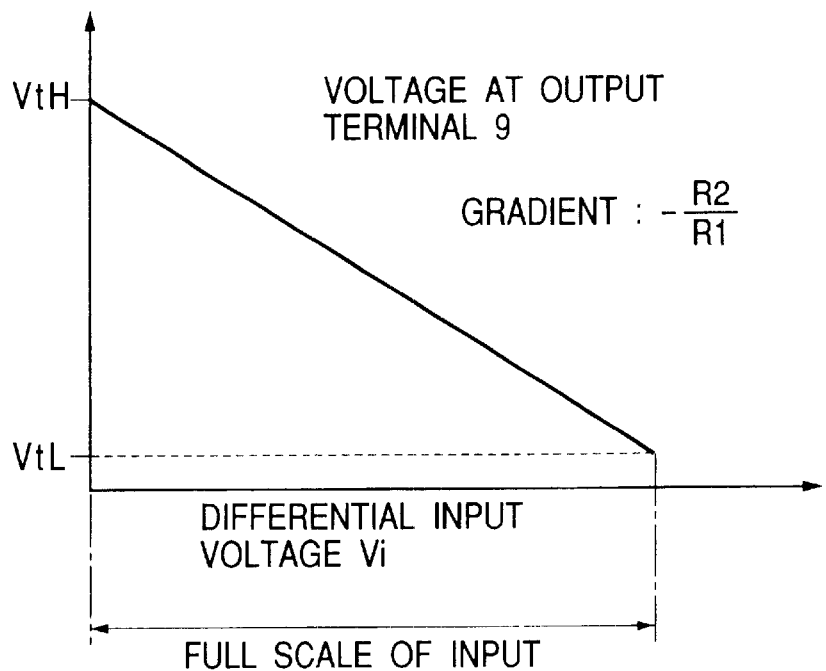
FIG. 4 is a diagram showing an output voltage at an output terminal 9.

FIG. 4 is a graph showing an output voltage at the output terminal 9. As shown in FIG. 4, the output voltage at the output terminal 9 can be expressed by a linear function of a gradient $[-R2/R1]$. If the differential input voltage $V_i$ is 0, the output voltage at the output terminal 9 is equal to $V_{iH}$. As the voltage $V_i$ becomes large, the output voltage becomes small in proportion to the gradient $[-R2/R1]$.

If the gradient $[-R2/R1]$ is determined so that the output voltage becomes equal to the lower limit $V_{iL}$ of the input dynamic range of the A/D converters 5 and 6 when a maximum value of a given full scale of the differential input voltage $V_i$ is input, then a maximum resolution of digital conversion by the A/D converter 5 can be obtained.

Figure 5:
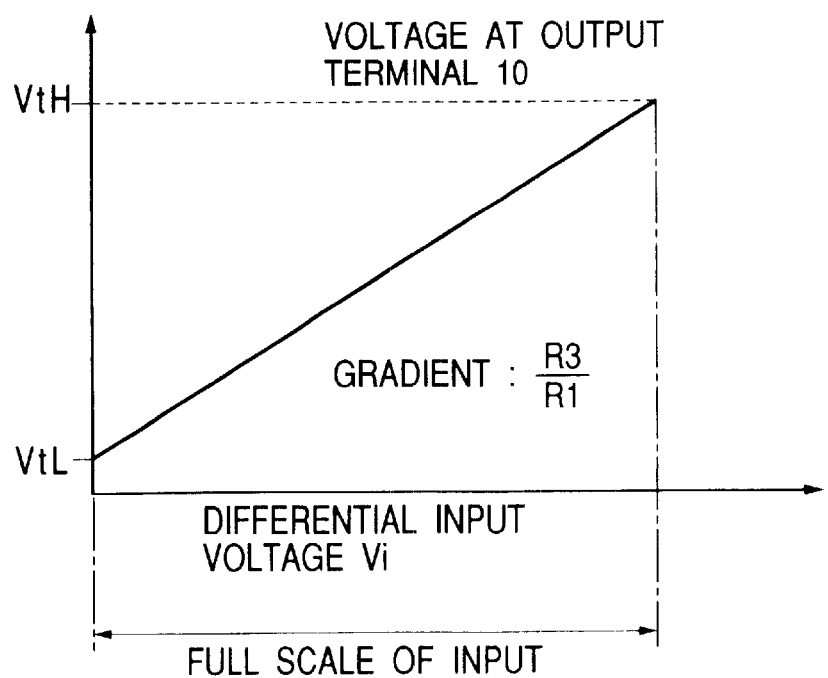
FIG. 5 is a diagram showing an output voltage at an output terminal 8.

FIG. 5 is a graph showing an output voltage at the output terminal 8. As shown in FIG. 5, the output voltage at the output terminal 8 can be expressed by a linear function of a gradient $[R3/R1]$. If the differential voltage $V_i$ is 0, output voltage at the output terminal 8 is equal to $V_{iL}$. As the voltage $V_i$ becomes large, the output voltage becomes large in proportion to the gradient $[R3/R1]$.

If the gradient $[R3/R1]$ is determined so that the output voltage becomes equal to the upper limit $V_{iH}$ of the input dynamic range of the A/D converters 5 and 6 when a maximum value of a given full scale of the differential input voltage $V_i$ is input, then a maximum resolution of digital conversion by the A/D converter 6 can be obtained. As above, it can be understood that a maximum efficiency can be obtained if the resistors R2 and R3 have the same value.

The voltages at the output terminals 8 and 9 are applied to analog input terminals of the A/D converters 5 and 6 and A/D converted to be input to the digital subtractor 7. The digital subtractor 7 subtracts the output signal from the A/D converter 5 from the output signal from the A/D converter 6.

The digital output of the digital subtractor 7 therefore corresponds to an analog voltage of:

$$[V_{iL}+(R3/R1)V_i]-[V_{iH}-(R2/R1)V_i]=[\{(R2+R3)/R1\}V_i-(V_{iH}-V_{iL})] \quad (1)$$

If R2=R3, the equation (1) becomes $[2(R2/R1)V_i-(V_{iH}-V_{iL})]$. The signal components therefore can have a full scale two times as large as that of the digital output of each of the A/D converters 5 and 6. As seen from the equation (1), the output voltage is not basically dependent upon a voltage having the same phase as the differential input voltage $V_i$. Thus, there is less influence of a variation in common mode voltage to be caused by the potential change at the power source and ground terminals.

More specifically, if an amplifier circuit and a digital circuit have the same impedance of the power source lines, switching noises generated in the digital circuit also appear at the power source lines of the amplifier circuit and thus at the output thereof to some extent.

However, switching noises leaked from the digital circuit and appeared at the output of the amplifier circuit have the same phase as the differential input voltage source. Therefore, the switching noises are attenuated by the common mode rejection ratio of the differential amplifier circuit whose input is M1 and M2 shown in FIG. 3. Furthermore, most of switching noises superposed upon the input voltages to the A/D converters 5 and 6 have the same phase so that these switching noises are subtracted from each other by the digital subtractor 7. From these reasons, the influence of switching noises can be suppressed.

Still further, since the output signals of the A/D converters 5 and 6 are subtracted from each other, the influence of noises on the ground line upon a single-ended output of the digital subtractor 7 can be alleviated almost completely. In this embodiment, although MOS type transistors are used, the signal processing circuit may be made of bipolar transistors.

In this embodiment, the output voltage is independent from a relative precision of a ratio between two resistor values, so that a very large common mode rejection ratio (CMRR) can be obtained. Furthermore, the number of components of the amplifier circuit shown in FIG. 3 can be reduced and the manufacture cost of the signal processing circuit can be lowered.

Figure 6A:
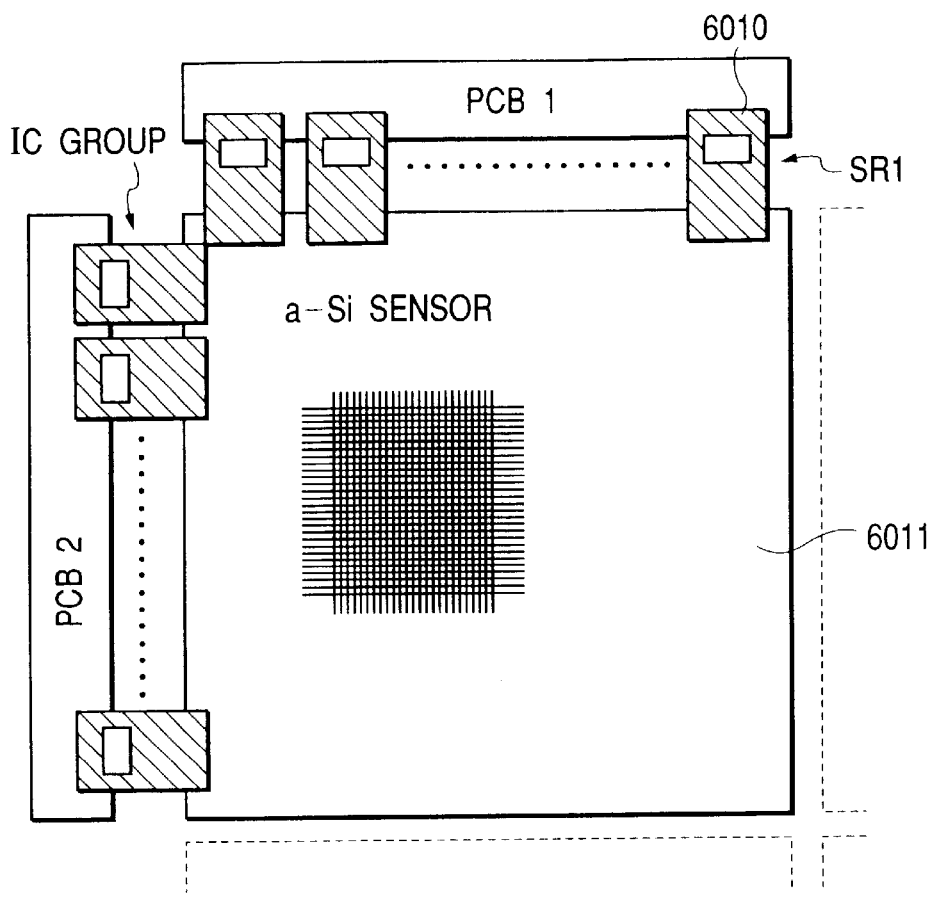
FIGS. 6A and 6B are a schematic diagram and a schematic cross sectional view of an X-ray diagnosis apparatus according to a second embodiment of the invention.
Figure 6B:
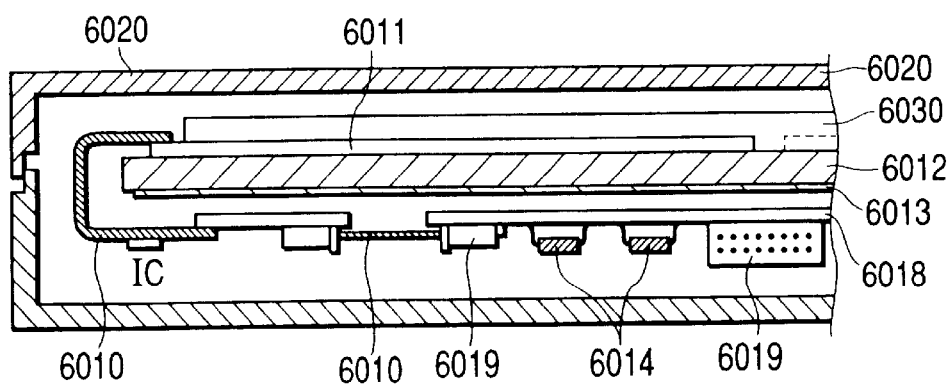

FIGS. 6A and 6B show a schematic diagram and a schematic cross sectional view of an X-ray image sensing apparatus with the signal processing circuit of the first embodiment, according to the second embodiment of the invention. The structure of the X-ray image sensing apparatus will be described first. A plurality of photoelectric conversion elements and transistors are formed on an amorphous silicon (a-Si) sensor substrate 6011. This substrate 6011 is connected to a flexible connector band 6010 on which shift registers SR1 and signal detecting ICs are mounted.

The flexible connector band 6010 is connected to printed circuit boards PCB1 and PCB2 on the other end opposite to the a-Si sensor substrate 6011. A plurality of a-Si sensor substrates 6011 are adhered to a base board 6012. On the bottom surface of the base board 6012 constituting a large size photoelectric conversion device, a lead plate 6013 is mounted in order to protect memories 6014 of a processing circuit 6018 from X-rays.

A fluorescent member 6030 is formed on the a-Si sensor substrates 6011 to convert X-rays into visual rays. For example, the fluorescent member 6030 is formed by coating or attaching CsI on the upper surfaces of the a-Si sensor substrates 6011. By using the photoelectric conversion device, X-rays can be detected. In this embodiment, as shown in FIG. 6B, the photoelectric conversion device is covered with a case 6020 made of carbon fibers.

Figure 7:
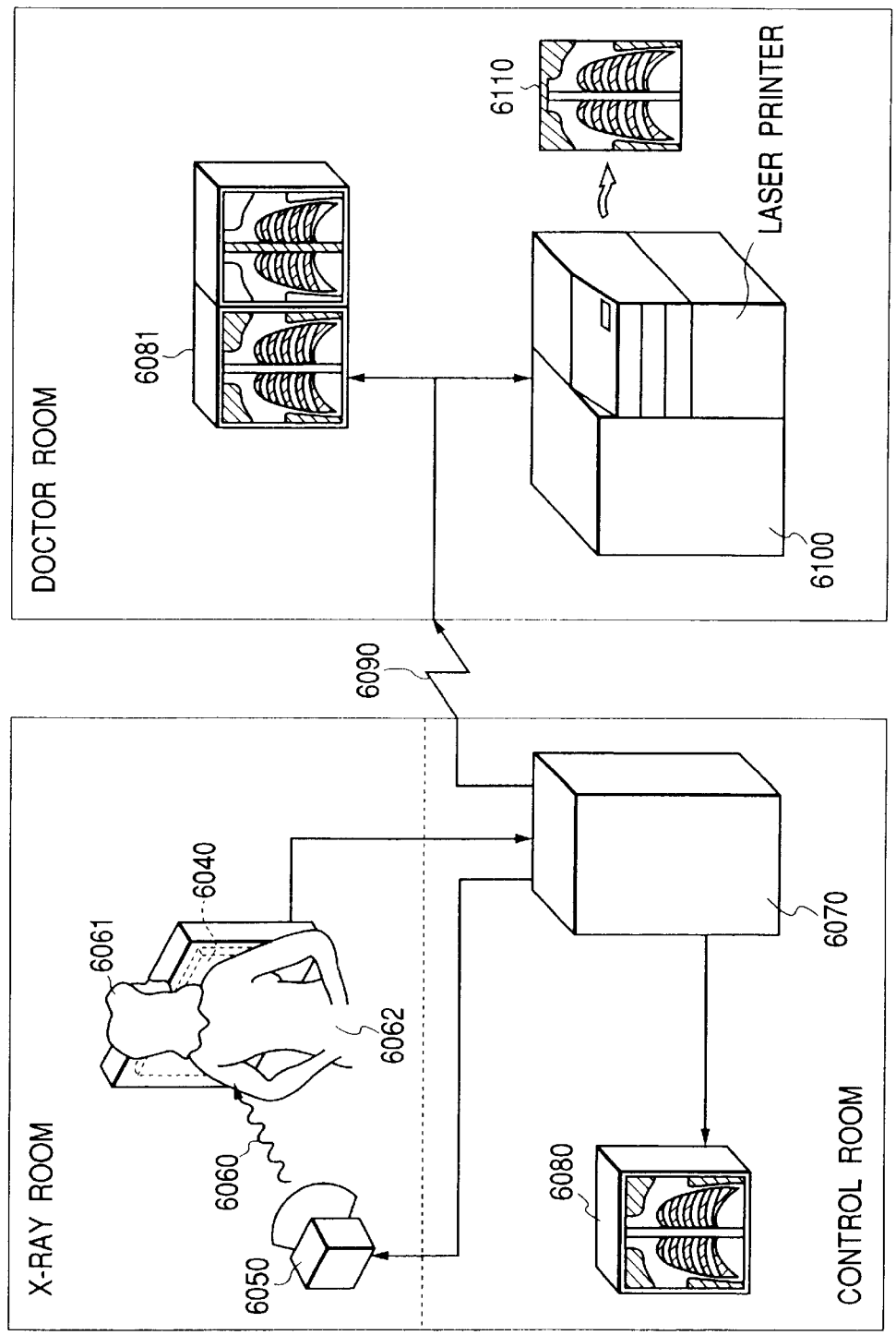
FIG. 7 is a diagram of an X-ray diagnosis system using the X-ray diagnosis apparatus shown in FIGS. 6A and 6B.

FIG. 7 is a diagram showing an X-ray diagnosis system of this embodiment. X-rays 6060 generated by an X-ray tube 6050 transmit through a chest 6062 of a patient or client 6061 and become incident upon a photoelectric conversion device 6040. The incidence X-rays contain information on the inside of the body of the patient 6061. A fluorescent member radiates light in correspondence with the incidence X-rays, and the light is photoelectrically converted to obtain electrical information.

This information is processed by the signal processing circuit described with the first embodiment to be converted into digital image data which is processed by an image processor 6070. The processed image can be monitored on a display 6080 installed in a control room.

This image data can be transmitted to a remote site via a transmission medium such as a telephone line 6090. At the remote site such as a doctor room, the transmitted image data may be displayed on a display 6081 to be diagnosed by a remote site doctor or stored in a storage medium such as an optical disk. The image data may be stored on a film 6110 by using a film processor 6100.

In this embodiment, although the photoelectrical conversion device is applied to an X-ray diagnosis system, it may be applied to a radiation ray image sensing system such as a non-destructive inspection apparatus using radiation rays such as α, β, γ rays other than X-rays.

As described so far, in the signal processing circuit described with the first and second embodiments, a difference signal between first and second signals is amplified by using as reference potentials the upper and lower limit values of a input dynamic range of conversion units, the amplified analog difference signals are converted into digital signals by the conversion units, and a difference between the converted digital signals is obtained. Accordingly, random noises can be reduced and the influence of switching noises can be alleviated considerably.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal processing circuit comprising:

a first differential circuit adapted to execute a differential operation between first and second signals to output a third signal, an amplifier adapted to output fourth and fifth signals in accordance third signal output from said first differential circuit;

a converter adapted to convert the fourth and fifth signals, which are analog signals into digital signals; and a second differential circuit adapted to execute a differential operation between the digital fourth and fifth signals converted by said converter, wherein said amplifier outputs the fourth and fifth signals in accordance with a signal level of the third signal, the fourth and fifth signals output from said amplifier having a signal level between lower and upper limit values of an input dynamic range of said converter.

2. A signal processing circuit according to claim 1, wherein said amplifier includes first and second amplifiers, the first amplifier adapted to increase a level of the fourth signal as the signal level of the third signal increases, by using the lower limit value as a reference lever, and the second amplifier adapted to decrease a level of the fifth signal as the signal level of the third signal decreases, by using the upper limit value as a reference level.

3. A signal processing circuit according to claim 2, wherein said first amplifier is a current feed back amplifier circuit adapted to receive the first signal at a negative polarity input terminal and receiving a voltage corresponding to the lower limit value at a positive polarity input terminal, and wherein said second amplifier is a current feedback amplifier circuit adapted to receive the second signal at a negative polarity input terminal and receiving a voltage corresponding to the upper limit value at a positive polarity input terminal.

4. A signal processing circuit according to claim 1, wherein said first differential circuit includes a pair of transistors, the pair of transistors is applied with the first and second signals at respective control electrode terminals of the transistors, first main electrode terminals of the pair of transistors are connected to each other via a resistor and also connected to a bias source, and second main electrode terminals of the pair of transistors are connected to current mirror circuits, and the current mirror circuits are connected to said converter.

5. An image processing apparatus comprising:

a photoelectric conversion unit adapted to convert a light signal into an electric signal:

the signal processing circuit recited in claim 1 adapted to process a signal output form said photoelectric conversion unit; and a storage unit adapted to store a signal processed by the signal processing circuit.

6. An image processing apparatus according to claim 5, further comprising:

a display adapted to display the signal processed by the signal processing circuit; and a radiation ray source adapted to radiate a radiation ray toward said photoelectric conversion unit.

7. A signal processing circuit comprising:

a first differential circuit adapted to execute a differential operation between a first signal and a second signal to output a third signal;

an amplifier circuit adapted to output fourth and fifth signals whose polarities are different from each other, based on the third signal; and a second differential circuit adapted to execute a differential operation between the fourth signal and the fifth signal.

8. An image processing apparatus comprising:

a plurality of photoelectric conversion blocks each of which includes a photoelectric conversion unit; and the signal processing circuit recited in claim 7, adapted to input a signal from said plurality of photoelectric conversion blocks, wherein the first signal is a photo-signal with reference to a black level of the photoelectric conversion block, and the second signal is the black level of the photoelectric conversion block.

9. An apparatus according to claim 8, further comprising a storing circuit adapted to store a signal output from said signal processing circuit.

10. An image processing apparatus comprising:

a plurality of photoelectric conversion blocks each of which includes a photoelectric conversion unit; and the final processing circuit recited in claim 7, adapted to input a signal from said plurality of photoelectric conversion blocks.

11. An apparatus according to claim 10, further comprising a storing circuit adapted to store a signal output from said signal processing circuit.

* * * * *

UNITED STATES PATENT AND TRADEMARK OFFICE
CERTIFICATE OF CORRECTION

PATENT NO. : 6,465,789 B1 Page 1 of 1
DATED : October 15, 2002
INVENTOR(S) : Takamasa Sakuragi It is certified that error appears in the above-identified patent and that said Letters Patent is hereby corrected as shown below:

Column 1,
Line 34, "amplifiers" should read -- amplifies --.
Line 37, "a" should read -- an --; and
Line 59, "in" should be deleted.

Column 2,
Line 7, "su h" should read -- such --.

Column 3,
Line 38, "12" should read -- I2 --.

Column 4,
Lines 6 and 22, "same" should read -- the same --;
Line 26, "$V_{ij}$." should read -- $V_i$]. --.

Column 6,
Line 28, "a" should read -- an --; and
Line 47, "accordance" should read -- accordance with --.

Column 7,
Line 2, "feed back" should read -- feedback --;
Line 24, "signal:" should read -- signal; --; and
Line 26, "form" should read -- from --.

Signed and Sealed this

Sixteenth Day of September, 2003

JAMES E. ROGAN
*Director of the United States Patent and Trademark Office*